Jan. 6, 1931.    B. SCHMITT    1,788,333
LACING CUTTER
Filed June 27, 1929
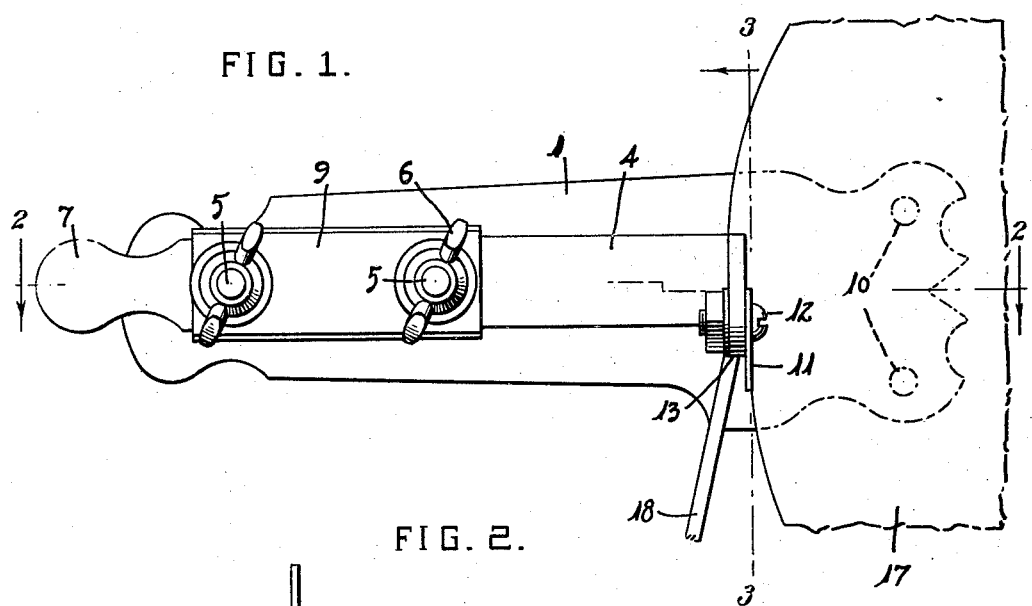
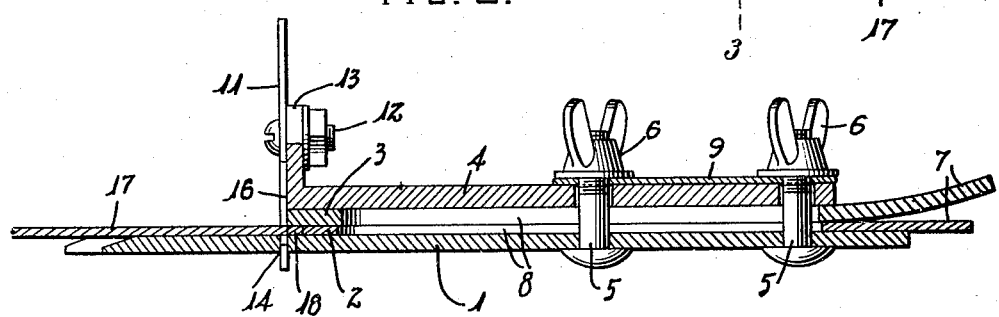
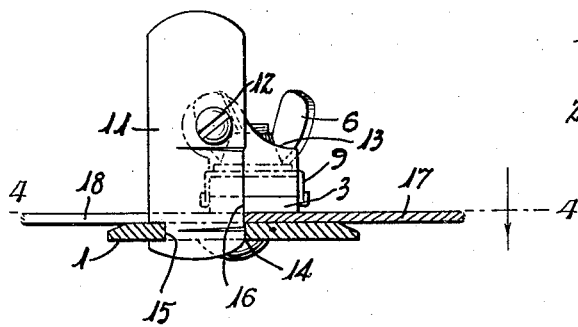
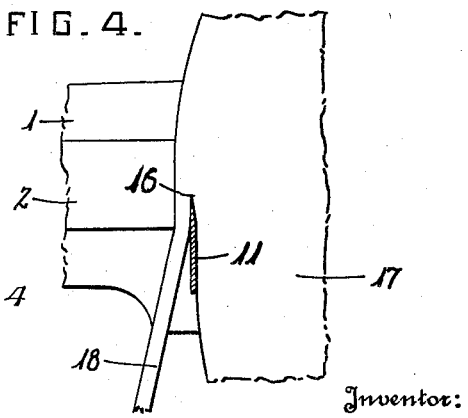
Inventor:
B. Schmitt
By Monroe Miller
Attorney.

Patented Jan. 6, 1931

1,788,333

UNITED STATES PATENT OFFICE

BASILIUS SCHMITT, OF DEVILS LAKE, NORTH DAKOTA

LACING CUTTER

Application filed June 27, 1929. Serial No. 374,257.

The present invention relates to devices for cutting lacings, straps, and the like, from sheets of leather and other material, and an object of the invention is the provision of a novel, simple and practical device of that kind.

Another object of the invention is the provision of a lacing or strap cutter comprising a novel assembly of the component elements, and having provision for adjustments for straps and lacings of different widths and thicknesses.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view of the improved lacing cutter.

Figs. 2 and 3 are sections on the respective lines 2—2 and 3—3 of Fig. 1.

Fig. 4 is a section on the line 4—4 of Fig. 3.

The device comprises a suitable base or bottom plate 1 on which are disposed the superposed gage bars 2 and 3, and a clamp bar 4 is disposed on the upper gage bar 3. Clamping bolts 5 extend through the base plate 1 and clamping bar 4 and have wing nuts 6 thereon for conveniently clamping the bars 2 and 3 between the plate 1 and bar 4.

The bars 2 and 3 are formed with handles or finger pieces 7 at their rear ends beyond the rear end of the bar 4, for conveniently sliding said bars 2 and 3 when the bolts 5 are loosened. The bars 2 and 3 have longitudinal slots 8 receiving the bolts to permit said bars to be adjusted longitudinally.

A saddle 9 engages the bolts 5 below the nuts 6 and straddles the bars 4 and 3, to provide a washer for said nuts.

The base plate 1 is provided with apertures 10 to receive screws or other securing elements for fastening the device down on a bench, table or other support.

A cutter blade 11 is disposed across the ends of the bars 2, 3 and 4 opposite to the handles 7, and is secured by a bolt 12 to the angularly extending terminal or ear 13 of the bar 4, thereby supporting said blade.

The lower end of the blade passes through a transverse slot 14 in the base plate 1, and has a notch 15 engaging the plate at one end of said slot, said slot being of a length less than the width of the blade, as seen in Fig. 3.

The blade 10 has a sharp edge 16 extending across the ends of the bars 2 and 3.

The bars 2 and 3 are of different thicknesses in order that different thicknesses of material may be cut.

As shown in the drawing, the sheet 17 to be cut is of a thickness substantially the same as that of the gage bar 2, and the gage bar 2 is spaced from the cutter blade 11 a distance equal to the width of the lacing or strap which is to be cut, so that the lacing or strap 18, as seen in Fig. 4, will pass between the blade 11 and bar 2 under the bar 3 which is in abutment with said blade.

When the material is started between the gage bar and blade the lacing or strap 18 is pulled by hand obliquely away from the blade, so that the lacing or strap is cut to the desired width. A lacing or strap of considerable length may be cut from a sheet or hide of circular or other suitable outline, the cut made being spiral. The device may also be used for cutting lacings or straps from sheets having straight edges.

When the sheet is thicker, the gage bar 3 may be spaced from the blade and the bar 2 slid against the blade, so that the lacing or strap will pass between the blade 11 and bar 3 over the bar 2, and both bars 2 and 3 may be spaced from the blade for a sheet of greater thickness than the bar 3.

Having thus described the invention, what is claimed as new is:

1. A device of the character described comprising a base plate, a clamping bar above said base plate, a gage bar between said clamping bar and plate, and a cutter blade secured to said clamping bar and plate, said gage bar being adjustable toward and away from said blade.

2. A device of the character described comprising a base plate, a clamping bar above said base plate, a gage bar between said clamping bar and plate, a cutter blade secured to said clamping bar and plate, and clamping means connecting said clamping bar and plate, said gage bar having a slot receiving said clamping means for the adjustment of said gage bar toward and away from the blade.

3. A device of the character described comprising a base plate, a clamping bar above the base plate, a cutter blade secured to said bar and plate, and a plurality of superposed gage bars slidable between said clamping bar and plate toward and away from said blade.

4. A device of the character described comprising a base plate, a clamping bar above the base plate, a cutter blade secured to said bar and plate, and a plurality of superposed gage bars slidable between said clamping bar and plate toward and away from said blade, said gage bars being of different thicknesses.

5. A device of the character described comprising a base plate, a clamping bar above the base plate, clamping means connecting said bar and plate, a cutter blade secured to one end of said bar, said plate having a slot receiving the blade, and a plurality of gage bars between the clamping bar and plate and having longitudinal slots receiving said clamping means for the adjustment of said gage bars toward and away from said blade.

6. A device of the character described comprising a base plate, a bar above said base plate, an upstanding cutter blade secured to said plate and bar, and a gage bar adjustably mounted between said plate and firstnamed bar and movable toward and away from said blade.

7. A device of the character described comprising spaced members, a cutter blade secured to at least one of said members, and a plurality of gage bars mounted adjustably between said members for movement toward and away from said blade.

In testimony whereof I hereunto affix my signature.

BASILIUS SCHMITT.